United States Patent [19]
Matt et al.

[11] 3,815,468
[45] June 11, 1974

[54] BRAIDED FABRIC BEARING LINER

[75] Inventors: Richard J. Matt, Simsbury; Thomas P. Rolland, Portland, both of Conn.

[73] Assignee: Textron Inc., Providence, R.I.

[22] Filed: Jan. 20, 1972

[21] Appl. No.: 219,259

[52] U.S. Cl. .......... 87/1, 57/140 BY, 87/8, 161/89, 161/92, 308/238, 308/DIG. 8
[51] Int. Cl. ...... F16j 15/22, D02g 3/04, D04c 1/06
[58] Field of Search ............... 87/1, 8; 57/140 BY; 28/75 R; 161/70, 88–98; 308/163, 238, DIG. 7, DIG. 8

[56] References Cited
UNITED STATES PATENTS

| | | | |
|---|---|---|---|
| 2,862,283 | 12/1958 | Rasero | 28/1 |
| 2,908,535 | 10/1959 | Runton et al. | 308/163 |
| 2,910,329 | 10/1959 | Runton | 308/163 |
| 2,919,219 | 12/1959 | Smith | 161/60 |
| 3,000,076 | 9/1961 | Runton et al. | 308/238 |
| 3,086,887 | 4/1963 | Habib | 161/88 X |
| 3,306,155 | 2/1967 | Zumeta et al. | 87/1 |
| 3,328,100 | 6/1967 | Spokes et al. | 308/238 |
| 3,534,652 | 10/1970 | Zumeta et al. | 87/1 |
| 3,765,978 | 10/1973 | Matt | 161/89 X |

*Primary Examiner*—John Petrakes
*Attorney, Agent, or Firm*—Sandoe, Hopgood & Calimafde

[57] ABSTRACT

Improved wear and load-carrying properties result for a resin-impregnated braided-fabric bearing wherein the bearing surface includes, as the most significant fabric component, threads which in the aggregate present at the bearing surface TFE filaments and high-temperature nylon filaments in the proportion of less than 50 percent TFE by volume. The threads are the result of winding, substantially without twisting, of strands which are fully washable, to remove sizing down to the innermost filaments. This enables full impregnation of the fabric with synthetic resin, and curing in substantially intimate and continuous and void-free relation of the resin to all filaments within the threads of the fabric.

14 Claims, 3 Drawing Figures

DIRECTION OF BRAID AXIS

DIRECTION OF BRAID AXIS

DIRECTION OF BRAID AXIS

BRAIDED FABRIC BEARING LINER

This invention relates to low-friction braided-fabric bearings and to the method of making the same.

Low-friction braided-fabric bearings in use today employ tetrafluoroethylene (TFE) filaments as the low-friction component but are subject to certain limitations which curtail the range of use. For example, maximum or excessive loads are accompanied by undue wear and rapid breakdown. And maximum operating temperature is unduly limited, due to further mechanical degradation under load or at elevated temperature. It is believed that many of these undesirable limitations arise from the assumption that a preponderance of TFE is required at the bearing surface.

It is, accordingly, an object of the invention to provide an improved bearing construction of the character indicated, and an improved method of making the same.

Another object is to provide a method and means whereby increased body density is provided in support material for low-friction fibers at the bearing surface.

A further object is to meet the above objects with greater load-bearing capacity, longer-wear performance and capability of operation at higher temperatures than heretofore.

A specific object is to provide increased support for low-friction fibers at the bearing surface, whereby TFE filaments are better retained against rolling to the point of breakage.

It is a general object to achieve the foregoing objects with a structure which is inherently relatively economical to manufacture, which is at least equal to the performance of present high-quality bearings within their limited range of use, and which extends beyond present bearings the range of performance in regard to useful life, maximum load and maximum elevated operating temperature.

Other objects and various further features of novelty and invention will be pointed out or will occur to those skilled in the art from a reading of the following specification in conjunction with the accompanying drawings. In said drawings, which show for illustrative purposes only, preferred forms of the invention:

The invention contemplates major reliance upon filaments of high-temperature nylon to function with TFE filaments in the yarn which is compounded for use as the low-friction bearing surface in a fabric bearing, the bearing being completed and consolidated by a cured synthetic resin. The nylon provides high strength and stability at elevated temperatures and is present in the yarn to the extent of at least 50 percent by volume of all filamentary components (including the TFE); preferably, the TFE filaments are present to the extent of 20 to 30 percent by volume.

Now, by braiding with threads which are characterized by little or no twist, and with preferably no twist in the TFE filaments, there is utmost assurance that the innermost filaments of all the TFE are loose and accessible for embedding in synthetic resin, even after performing the braiding operation. Also, due to such loose construction, it is possible to thoroughly wash off the sizing agents, particularly from the TFE filaments, using a suitable solvent for the sizing agent. Washing produces a limp fabric, with even more voids within the strands, and cleansed down to the very walls of the individual filaments. Vastly greater affinity of the filaments is found for liquid synthetic resin, after such washing, and drying the fabric. It is surmised that the cleansed filaments establish plural capillary paths which, due to the small degree (if any) of twist, readily "wick" or induce the flow of liquid resin to the core of the thread strands, in intimate, continuous and void-free relation with all filaments thereof. Analysis confirms unusual resin-rich support for all filaments, providing unusual high density at and near the bearing surface.

The first two figures illustrate specific braid patterns, constituting separate examples of the invention. In both examples, the fabric comprises strands of primarily TFE filaments and strands of primarily filaments of a high-temperature nylon. These strands are of substantially equal volumetric bulk, the number of strands of the nylon being an integer multiple of the number of strands of the TFE, and a given plurality of said strands is combined in side-by-side untwisted relation to define the individual threads of the braided fabric. To complete a bearing, such as a journal bearing, the braid may be constructed as a bearing liner, on a mandrel, and coated with liquid epoxy, phenolic or other hardenable material; the backing may be wound fiberglass, further impregnated with hardenable material, all as set forth in copending application Ser. No. 94,091, filed Dec. 1, 1970, now U.S. Pat. No. 3,692,375, the mandrel being removed after curing the hardenable material.

EXAMPLE ONE

Figure 1:
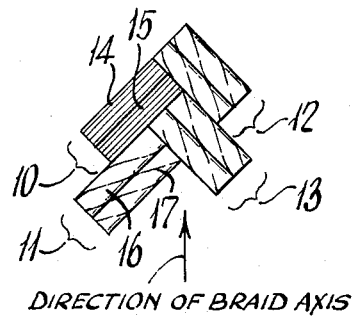
FIG. 1 is a simplified elemental diagram of the basic repeating chevron pattern in a first braid incorporating the invention.

A braided fabric is produced with the basic repeating chevron pattern of FIG. 1, in which a TFE thread 10 and a nylon thread 11 are in side-by-side interlaced relation for one direction of helical advance, and in which two further nylon threads 12-13 are in similar side-by-side relation for the opposite direction of helical advance. The TFE thread comprises two like strands or ends 14-15 of 1,200-denier TFE wound onto a carrier, in side-by-side and substantially untwisted relation. The remaining three threads 11-12-13 are identical to each other, being two like strands (as at 16-17 for the case of thread 11) wound onto a carrier, in side-by-side and substantially untwisted relation, each strand (16, 17) comprising two ends of 200-denier Nomex* loosely twisted together; the said twist is preferably in the range of one to three per inch, to assure the desired looseness and yet an ability to exert radially compressive backing for those TFE filaments and nylon filaments which it is called upon to back and to radially inwardly load, at the bearing surface.

*Trademark of the E. I. DuPont Company for its high-temperature nylon.

In a specific fabrication of this braid, a 120-carrier machine was employed, with 96/36 gear ratio, using 90 carriers of the Nomex thread and 30 carriers of the TFE thread. The TFE eroded at the bearing surface is spread over and entrapped at Nomex areas, resulting in low-friction TFE action over the entire bearing surface, it being understood that sliding movement at the bearing interface is oriented primarily transverse to the indicated direction of the braid axis. For the case illustrated, the TFE:Nomex ratio at the bearing surface is one-to-three, i.e., the TFE percentage is at least no greater than 25 percent of the fabric area at the bearing surface.

EXAMPLE TWO

Figure 2:
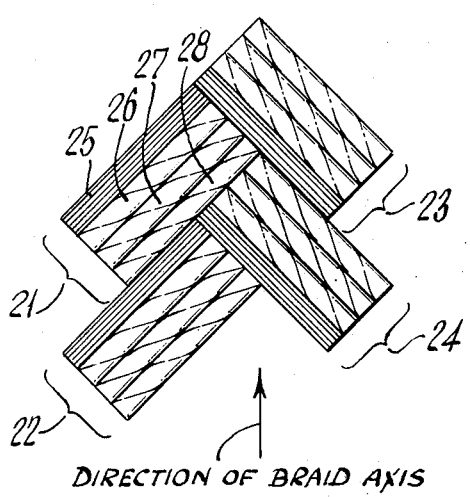
FIG. 2 is a view similar to FIG. 1 for the case of a second braid of the invention.

A braided fabric is produced with the basic repeating chevron pattern of FIG. 2, in which the same thread, combined from a TFE strand and from several Nomex strands, is used for each of the four threads (21-22-23-24) of the basic pattern. This same thread is shown, for the case of thread 21, to comprise a TFE strand 25 which is one end of 1,200-denier TFE; the thread 21 further comprises three like Nomex strands 26-27-28, each of which is two ends of 200-denier Nomex loosely twisted together. The four strands 25-26-27-28 are wound onto a carrier, in side-by-side untwisted relation, and it matters not whether the TFE strand is centrally located or at one edge (as shown). As with the case of Example One, the fabric of Example Two exhibits a one-to-three TFE:Nomex ratio at the bearing surface.

In a specific fabrication of the braid of Example Two, a 72-carrier machine was employed, with 72/52 gear ratio. Of course, all carriers used the same combined thread or yarn, the basic pattern being established by two threads advancing in one helical direction, and the remaining two threads advancing in the opposite helical direction. Again, the TFE eroded at the bearing surface becomes entrapped at Nomex areas, resulting in low-friction TFE action over the entire bearing surface.

Figure 3:
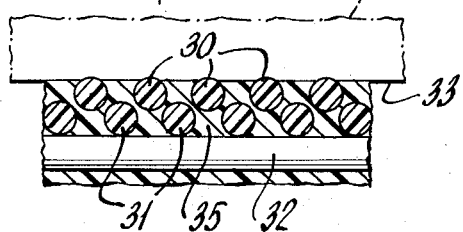
FIG. 3 is a simplified enlarged fragmentary sectional view to illustrate part of a bearing incorporating a fabric of the invention.

The described invention is found to meet all stated objects, producing a high-quality bearing, with extended load and temperature performance capabilities. The preferred technique involves washing to remove sizing prior to application of the hardenable material. Such washing may be performed after braiding and on a mandrel, or it may be performed on the limp "sock" or tube which constitutes the braided fabric alone. In addition to the technique alluded to above, and to produce a journal bearing, the washed limp fabric may be applied to a forming mandrel with the hardenable material and with a backing, in the manner set forth in copending patent application, Ser. No. 116,096, filed Feb. 17, 1971, and now abandoned. Regardless of the technique employed, the cured resin-impregnated bearing liner is generally illustrated by FIG. 3, which depicts a TFE-rich region, wherein the strand or thread of TFE, comprising plural untwisted filaments 30-31, is compressed by a crossing filament 32 of the Nomex thread, against the surface 33 of a mandrel or shaft 34; the impregnating hardenable material 35 fills all voids, being well-wicked to the filaments 30-31-32 by reason of washing to remove sizing, and only small regions of the filaments 30 at the interface are directly exposed for self-lubrication of the bearing.

The invention is seen to provide good control of the distribution of TFE over the bearing interface, without sacrifice of filmaentary support and retaining the tensile-strength benefits of the Nomex. The invention is not limited to the particular 3:1 proportion of Nomex to TFE, since the examples are merely intended to illustrate two techniques by which a desired proportion may be so well and uniformly distributed over the bearing-interface area as to assure uniform distribution and useful entrapment of the eroded TFE.

What is claimed is:

1. A braided low-friction bearing fabric, comprising strands of primarily TFE filaments and strands of primarily filaments of a high-temperature nylon, said strands being of substantially equal volumetric bulk, the number of strands of the nylon being an integer multiple of the number of strands of the TFE, a given plurality of said strands being combined in side-by-side untwisted relation to define the individual threads of the braided fabric.

2. A braided fabric according to claim 1, in which each of the combined threads in said fabric is the same, with a strand of the TFE in side-by-side relation with said integer multiple of adjacent strands of the nylon.

3. A braided fabric according to claim 2, in which each of said combined threads is a blend in which the TFE strand is one end of 1,200-denier TFE.

4. A braided fabric according to claim 3, in which each of the nylon strands comprises two ends of 200-denier nylon.

5. A braided fabric according to claim 4, in which each thread comprises one strand of TFE and three strands of the nylon.

6. A braided fabric according to claim 1, in which said integer multiple is three.

7. A braided fabric according to claim 1, in which a first number of the combined threads in said fabric are all-TFE, being in said plurality and in side-by-side relation, and in which a second number of the combined threads in said fabric are all-nylon, being in said plurality and in side-by-side relation, said second number being an integer multiple of said first number, and the threads of said first number being uniformly distributed in interlaced relation with the threads of said second number.

8. A braided fabric according to claim 7, in which each thread of the TFE comprises two strands of 1,200-denier TFE.

9. A braided fabric according to claim 8, in which each thread of the nylon comprises two strands, each of said nylon strands comprising two ends of 200-denier nylon twisted together.

10. A braided fabric according to claim 9, in which all nylon threads are oriented in the same direction of helical advance.

11. A braided fabric according to claim 10, in which nylon and TFE threads are equally interlaced for said direction of helical advance.

12. A low-friction bearing comprising the fabric of claim 1 consolidated into a backing which includes cured hardenable resin material permeating said strands and exposing filaments on one side of said fabric.

13. The method of making the fabric of claim 1, wherein said strands are combined into threads by winding onto a carrier in substantially an untwisted relation of strands to each other.

14. A braided low-friction bearing fabric wherein a first filamentary stranding and a second filamentary stranding are interlaced in oppositely inclined directions of advance with respect to a general longitudinal direction of braid advance; said braid being so characterized for each interval of interlace that the number and volumetric bulk of plural strands in said first direction are equal to the number and substantial volumetric bulk of the strands in said second direction, and that at least one of said strands is primarily TFE filaments while the remainder of said strands are of a high-temperature nylon, the number of said remainder strands exceeding the number of said TFE strands, the strands of each set of plural strands being in side-by-side untwisted relation so that for each interlace each strand is presented without interruption at the fabric surface; whereby assurance is obtained that for each period of interlace the fabric surface is characterized by the same proportion, orientation and disposition of TFE filaments to nylon filament, so that when consolidated with a cured impregnant resin wherein the fabric surface conforms to and defines a bearing interface, a source of TFE is available for total interface lubrication no matter what the direction or amplitude of bearing movement at the interface as long as such movement is at least in the order of magnitude of the interval of interlace.

* * * * *